Figure 1:
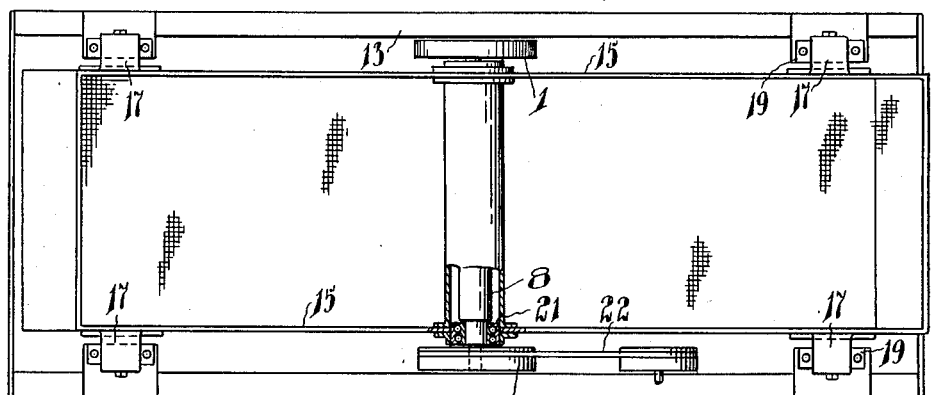

March 5, 1940.    R. STROUD    2,192,420
MECHANISM FOR IMPARTING A GYRATORY MOVEMENT TO SCREENS
Filed Dec. 12, 1938    2 Sheets-Sheet 1

Inventor
R. Stroud
by
J. Edw. Maybee
ATTY

March 5, 1940.　　　　R. STROUD　　　　2,192,420
MECHANISM FOR IMPARTING A GYRATORY MOVEMENT TO SCREENS
Filed Dec. 12, 1938　　　2 Sheets-Sheet 2

Inventor
R. Stroud
by J. Edw. Maybee
ATTY.

Patented Mar. 5, 1940

2,192,420

UNITED STATES PATENT OFFICE 2,192,420

MECHANISM FOR IMPARTING A GYRATORY MOVEMENT TO SCREENS

Robert Stroud, Toronto, Ontario, Canada, assignor to Niagara Screens & Machines Limited, Toronto, Ontario, Canada Application December 12, 1938, Serial No. 245,091

2 Claims. (Cl. 74—61)

This invention relates to gyrating mechanism for screens used in the separation of granular material, and my object is to devise simple and effective mechanism for this purpose in which the mechanism is carried entirely by the vibratory screen frame and to provide automatic regulation to prevent too violent gyratory action of the device at high speed.

I attain my object by means of the constructions which may be briefly described as follows: The screen frame itself is resiliently supported on or from a stationary frame in such a manner that it is readily movable within the limits of the orbit of gyration. The gyratory movement of the screen frame is effected by the following mechanism: A straight shaft is journalled on the frame of the screen. If this shaft were driven by a belt and a balanced concentric pulley secured to the shaft no effect on the screen would be produced. Therefore to produce a gyratory movement there is an unbalancing weight secured to the shaft, the centre of gravity of which is to one side of the centre of the shaft. In the present construction the weight is formed as part of a flywheel having its rim formed as a belt pulley. The shaft being then unbalanced by the offsetting of the centre of gravity of the weight relative to the axis of the shaft has a gyratory movement so that in order to effect a belt drive it is essential that the pulley or rotary drive means be concentric with the centre about which the shaft gyrates as thus the belt pulley axis remains substantially stationary in space when the device is operating.

If the speed of rotation increases too much the gyratory effect will become too violent. This effect is counterbalanced by a spring loaded weight or weights which move out radially of the flywheel and reduce the unbalance of the shaft as speed increases. As an alternative to the belt drive, the drive might be by a shaft secured to the device and having its geometrical centre offset relative to the shaft so that the axis of its rotation will pass through the centre of gyration of the shaft.

Of course, the unbalancing weight, the counterbalancing weight, and the pulley may all be independently connected to the shaft but preferably they are arranged to form a unit as in the drawings.

Figure 2:
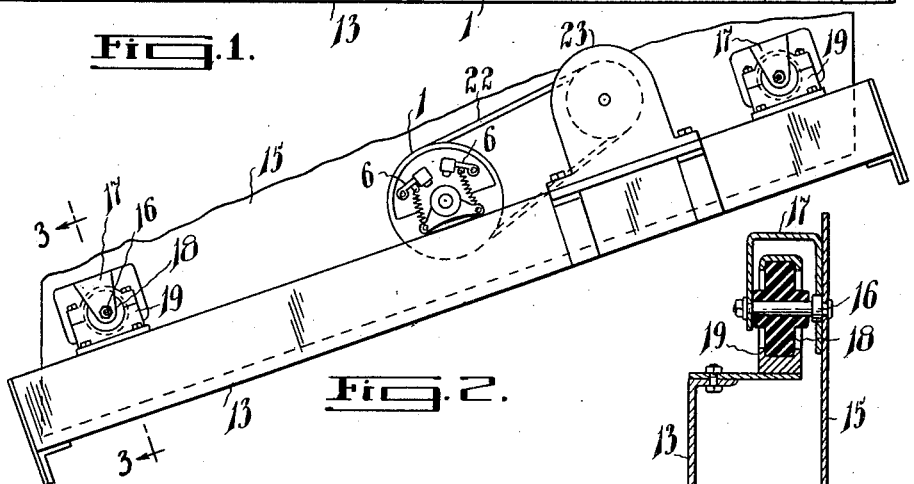
Figure 3:
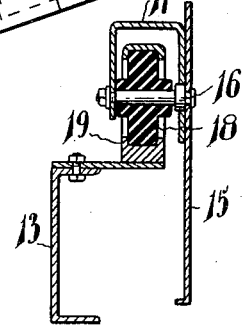
Figure 4:
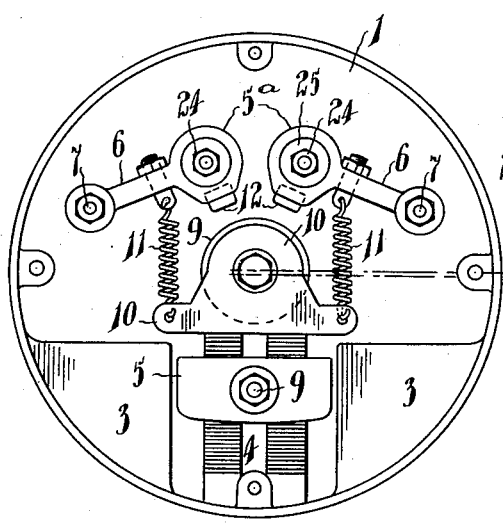
Figure 5:
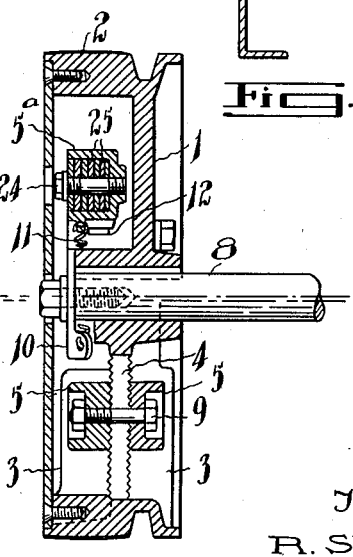

The invention is hereinafter more fully described and is illustrated in the accompanying drawings in which Fig. 1 is a plan view of a screen provided with my improved drive;

Fig. 2 a side elevation of the same partly broken away;

Fig. 3 a section on the line 3—3 in Fig. 2 but on a larger scale;

Fig. 4 a front elevation of the flywheel and driving mechanism showing the counterbalancing weights in an intermediate position;

Fig. 5 a vertical section of the same; and

Figure 6:
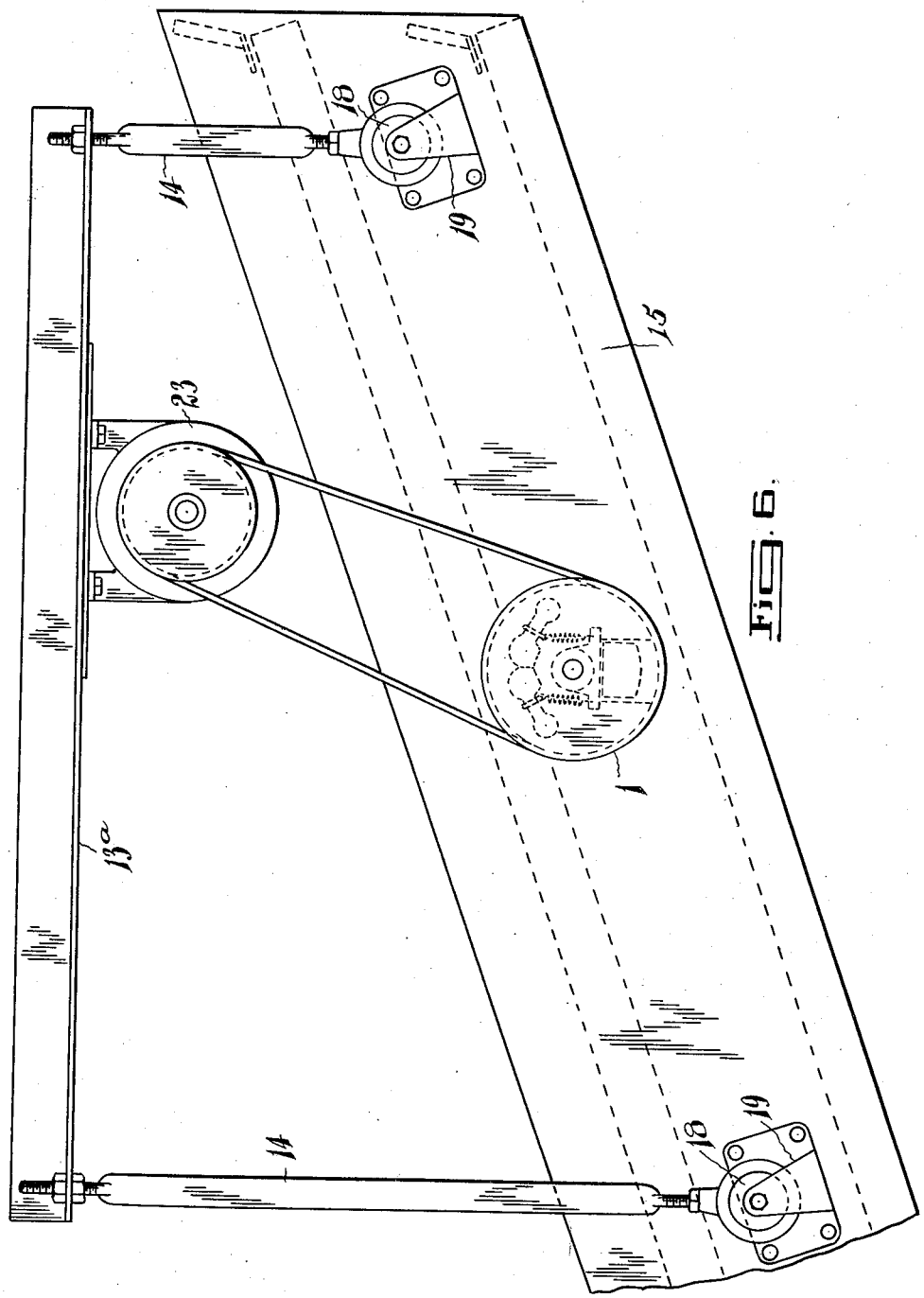

Fig. 6 a side elevation showing a preferred form of suspension for the vibratory screen frame.

In the drawings like numerals of reference indicate corresponding parts in the different figures.

Referring to Figs. 1 to 4 of the drawings, 13 is a supporting frame of any suitable material and which itself may be supported in any desired manner. 15 is the vibratory screen frame which carries ordinary screens and in a manner common in the art. The vibratory screen frame 15 is resiliently supported on the frame 13 so that it may move thereon within the limits of the orbit of gyration. An ordinary connection is shown in the drawings in which a pin 16 is carried by a bracket 17 secured to the screen frame. This pin carries a bushing 18 which engages the annular U-section casing 19 which is carried by the frame 13.

As an alternative to the supporting means just described, the vibratory screen may be hung from overhead supports 13a to which are secured the upper ends of the hangers 14 which, at their lower ends, are connected to the U-section casings 19, these casings being inverted, as shown, thus differing from their position in Fig. 2 in which the support of the vibratory screen frame is from below. The motor 23 is in this case secured to the overhead support which may be part of the superstructure of the building.

The gyratory mechanism is constructed substantially as follows: A shaft 8 is supported in suitable bearings 21 on the vibratory screen frame itself. While any bearings may be employed, I prefer that they be of the ball or roller bearing type. A flywheel 1 is secured to the shaft in the position hereinafter described. This flywheel has its rim 2 formed as a belt pulley, preferably with both a crowned face and a grooved face, as shown, according to the style of driving belt to be employed. 3 is an unbalancing weight which is connected with the shaft through the flywheel and is preferably formed integral with the latter. The web of the flywheel is formed with a slot 4 through which passes a bolt 9 adapted to secure in position the weights 5. The contacting faces of the weights and the web of the flywheel are preferably corrugated or roughed to give a suitable grip between the parts when the bolt is tightened. These weights, it is evident, are easily adjusted radially to suit the amount of overbalance required. It will be noted that the shaft 8 is connected with the web of the flywheel not at the geometrical centre of the same but in alinement with the axis about which the shaft 8 gyrates when the belt pulley is driven, thus the flywheel or belt pulley is easily driven by means of a belt 22 from the motor 23 secured to the supporting frame.

It sometimes happens, particularly when there is a light load on the screen, that the motor will speed up and drive the flywheel at such a rate as to cause a too violent gyratory motion. To counterbalance this high speed effect the following means are provided: Journalled at one end on the web of the flywheel are the arms 6, 7 being the pivots thereof. Each arm carries at its outer end a weight 5ª. These weights are normally drawn in towards the hub of the flywheel by means of the springs 11. The springs 11 are each secured at one end to one of the arms 6, while the other end of each spring is connected to one end of the plate 10 fitted about the hub of the flywheel. Buffers 12 are provided for engagement with the hub 9 of the flywheel to limit the inward movement of these counterbalancing weights. These weights come into action if the speed of rotation becomes too great and by moving outwardly tend to offset the effect of the fixed unbalancing weight 3.

It is desirable that these counterbalancing weights should be adjustable in weight.

To enable this to be effected I form each weight as a hollow chamber open at the front. By means of a headed bolt 24 a number of lead disks 25 may be securely held in place within the hollow and more or less of these weights may be removed as may be necessary to obtain the desired counterbalancing effect.

It will be understood that the vibrating mechanism will be duplicated at the far end of the shaft 8, though it is not necessary to drive from both ends of the shaft.

From the above description it will be seen that I have devised a construction which will satisfactorily attain the objects of my invention as set out in the preamble to this specification.

What I claim as my invention is:

1. Screen gyrating mechanism comprising a straight driving shaft journalled on and adapted to actuate the screen; an unbalancing weight connected with the shaft; rotary driving means connected to the shaft with its axis of rotation eccentric to the axis of the shaft and having its geometrical centre substantially coincident with the imaginary centre of the orbit of gyration of the shaft under normal unbalance so that when the device is normally operating the driving means is substantially stationary in space; and a radially movable spring-pressed counterbalancing weight radially movable outward against the spring pressure to progressively reduce the unbalance at high speeds.

2. Screen gyrating mechanism comprising a straight driving shaft journalled on and adapted to actuate the screen; an unbalancing weight connected with the shaft; and rotary driving means connected to the shaft with its axis of rotation eccentric to the axis of the shaft and having its geometrical centre substantially coincident with the imaginary centre of the orbit of gyration of the shaft under normal unbalance so that when the device is normally operating the driving means is substantially stationary in space.

ROBERT STROUD.